United States Patent
Marrone et al.

(10) Patent No.: US 12,448,350 B2
(45) Date of Patent: Oct. 21, 2025

(54) PROCESS FOR PRODUCING LOW-BIURET UREA

(71) Applicant: Casale SA, Lugano (CH)

(72) Inventors: Leonardo Marrone, Mercallo (IT); Alberto Benedetti, Como (IT); Paolo Bertini, Lugano (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 18/647,214

(22) Filed: Apr. 26, 2024

(65) Prior Publication Data

US 2024/0294469 A1    Sep. 5, 2024

Related U.S. Application Data

(63) Continuation of application No. 17/797,350, filed as application No. PCT/EP2021/050475 on Jan. 12, 2021, now abandoned.

(30) Foreign Application Priority Data

Feb. 4, 2020 (EP) ..................................... 20155392

(51) Int. Cl.
    *C07C 273/16*    (2006.01)
    *B01D 3/06*    (2006.01)
    *B01D 5/00*    (2006.01)
    *B01D 61/02*    (2006.01)
    *C07C 273/04*    (2006.01)

(52) U.S. Cl.
    CPC .............. *C07C 273/16* (2013.01); *B01D 3/06* (2013.01); *B01D 5/0072* (2013.01); *B01D 5/0084* (2013.01); *B01D 61/026* (2022.08); *C07C 273/04* (2013.01); *B01D 2311/06* (2013.01); *B01D 2311/08* (2013.01); *B01D 2313/50* (2013.01); *B01D 2317/027* (2013.01)

(58) Field of Classification Search
    CPC ........................... C07C 273/16; B01D 61/026
    USPC .......................................................... 564/67
    See application file for complete search history.

(56) References Cited

U.S. PATENT DOCUMENTS 4,157,348 A    6/1979    Ono et al.

FOREIGN PATENT DOCUMENTS

| EP | 1857439 A1 | 11/2007 |
|---|---|---|
| EP | 1856038 B1 | 9/2011 |

OTHER PUBLICATIONS

International Search Report dated Apr. 30, 2021 issued in connection with PCT/EP2021/050475.
Written Opinion of the International Searching Authority dated Apr. 30, 2021 issued in connection with PCT/EP2021/050475.
International Preliminary Report on Patentability dated Apr. 30, 2021 issued in connection with PCT/EP2021/050475.

*Primary Examiner* — Ana Z Muresan
(74) *Attorney, Agent, or Firm* — Akerman LLP

(57) ABSTRACT

A process for purifying a urea-containing aqueous stream, such as the aqueous stream from the recovery section of a urea plant, comprising a step of removing biuret from the urea-containing stream by reverse osmosis in one or more reverse osmosis stages.

21 Claims, 2 Drawing Sheets

PROCESS FOR PRODUCING LOW-BIURET UREA

CROSS-REFERENCE TO RELATED APPLICATIONS

This application is a continuation of U.S. patent application Ser. No. 17/797,350, filed Aug. 3, 2022, which is a national phase of PCT/EP2021/050475, filed Jan. 12, 2021, and claims priority to EP 20155392.2, filed Feb. 4, 2020, the entire contents of all of which are hereby incorporated by reference.

DESCRIPTION

Field of the Invention

The invention relates to the field of production of urea or urea-based products. The invention relates in particular to the removal of biuret from aqueous solutions of urea.

Prior Art

Urea is synthesized industrially by reacting ammonia and carbon dioxide. An overview of the related processes can be found in the Ullmann's Encyclopaedia of Industrial Chemistry, Wiley-VCH Verlag.

Urea is typically produced by reacting ammonia and carbon dioxide in a urea synthesis section at a suitable urea synthesis pressure, to form a urea-containing reaction effluent. This effluent is essentially an aqueous solution of urea containing unreacted ammonia and carbon dioxide, mostly in the form of ammonium carbamate. In a well known embodiment the synthesis section includes a reactor, a stripper and a condenser forming a high-pressure loop. The reactor effluent is heated in the stripper, possibly with the help of a gaseous stripping agent, to remove a gaseous stream containing ammonia and carbon dioxide. This gaseous stream emerging from the stripper is condensed in the condenser, possibly with the help of a solution recycled from the recovery section. The so obtained condensate is recycled to the reactor. The famous Stamicarbon $CO_2$-stripping process uses gaseous $CO_2$ as a stripping agent. Another stripping process uses gaseous ammonia as a stripping agent.

The reaction effluent is typically processed in a recovery section, including one or more recovery stages at a recovery pressure lower than said synthesis pressure, to remove the unreacted ammonia and carbon dioxide from the reaction effluent and to obtain a urea aqueous solution consisting essentially of urea and water. A recovery stage for example includes heating the solution to obtain dissociation of carbamate and condensing the so obtained vapours into a carbamate-containing recycle solution. This solution may be recycled to the synthesis section, e.g. to the condenser of the synthesis loop.

The aqueous solution withdrawn from the recovery section typically contains 60% to 90% urea by weight. This solution may be processed to remove water and obtain a highly concentrated solution or a urea melt to feed a granulation section or prilling section where solid urea is produced. It is known that a granulation section requires an input urea melt containing at least 96% of urea by weight; a prilling section requires a urea melt of at least 99.7% of concentration.

Another use of urea of economic interest is the production of an aqueous solution of urea for use in the selective catalytic reduction of NOx from exhaust gas (SCR solution).

The content of urea in a SCR solution may vary; a solution for use in the automotive field, so called diesel exhaust fluid (DEF), typically contains 30 to 35% by weight, preferably 31.8% to 33.2% and most preferably 32.5% of urea. To this purpose, the urea solution from the recovery section may be diluted with water until the target concentration of urea is reached as disclosed for example in EP 1 856 038.

The solution from the recovery section consists mostly of urea and water but also contains some impurities. One of the most problematic impurity is biuret.

The formation of biuret occurs practically in every stage of urea production and is promoted by residence time at high temperature.

Biuret has the formula $H_2N-CO-NH-CO-NH_2$ and forms when urea is heated above its melting point according to the reaction:

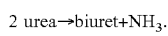

$$2\ \text{urea} \rightarrow \text{biuret} + NH_3.$$

The quality requirements of the final product in terms of maximum acceptable content of biuret are stringent and difficult to achieve. A typical target for solid urea is 0.9% wt. or less, calculated as kg of biuret per kg of solid product.

This target is typically required for use of the solid urea as soil fertilizer; a foliar-grade fertilizer may have a significantly lower limit of acceptable biuret. As explained above, the starting material for production of solid urea is an aqueous solution containing 60 to 80% wt. urea which is treated to remove water and the so obtained highly concentrated melt is granulated or prilled.

It is difficult to maintain such a low biuret content in the final product. As the content of biuret obviously increases when water is removed, a producer of urea may be forced to lower the concentration of the urea melt sent to the granulation or prilling section in order to meet the maximum biuret in the solid urea. However the granulation process or prilling process are strongly affected by any additional content of water in the urea melt feed.

Similar requirements in terms of maximum biuret are encountered in the production of SCR solutions. For example the maximum acceptable biuret in the DEF is typically 0.3% wt, as prescribed e.g. by the DIN V70070 Norm. Taking into account the 30 to 35% concentration of urea in the DEF, this means that solid urea dissolved to produce the DEF shall not exceed 0.9% of biuret. If the DEF is produced directly by diluting a 70% solution, the starting solution must not exceed 0.6% of biuret (all percentages by weight).

The control of biuret is also complicated by the fluctuations of the production. For example when a urea plant runs at a partial load the residence time of urea melt at high temperature may be longer and, consequently, more biuret is formed.

A known process to obtain a low-biuret solid urea from the aqueous solution withdrawn from the recovery section is concentration by crystallization. In this process, crystals of highly pure urea are obtained and subsequently melted to produce a urea melt. However crystallization is expensive. It requires centrifugation to separate the crystals from the solution; careful handling of crystals e.g. by pneumatic means; a melter to melt the crystals. All the above requires items which are expensive and difficult to operate.

There is the need to provide a process for obtaining low-biuret urea solution which is cost-effective, easy to implement and manage, efficient also at partial loads, and compatible with a concentration section based on evaporation.

SUMMARY OF THE INVENTION

The purpose of this invention is to overcome the above described drawbacks of the prior art. A goal of the invention is to provide a cost-effective and practical process for removing biuret from an aqueous solution of urea. Particularly, a goal of the invention is to provide a process for removal of biuret which is applicable to a process for producing urea including concentration by evaporation. Still another goal is to provide a process for making urea with a low content of biuret to meet the nowadays stringent quality requirement. Another goal is to provide a process for removing biuret which is effective also at partial loads of a urea plant.

In one application, the invention aims to produce solid urea with no more than 0.9% by weight of biuret, preferably no more than 0.7% wt, with a process including concentration by evaporation and subsequent granulation or prilling. With reference to another preferred application, one aim of the invention is a process for producing a SCR solution with a low content of biuret although the initial solid product to be dissolved or the urea solution to be diluted contains high level biuret. Particularly, one aim is to produce a SCR solution in accordance with the quality requirements of the DIN 70070 Norm, including no more than 0.3% biuret by weight.

The above aims are reached with a process according to the claims. The dependent claims disclose preferred embodiments.

The invention is based on the innovative idea to remove biuret from a urea-containing aqueous solution by means of reverse osmosis.

The reverse osmosis (RO) is a process known in itself which involves the passage of an aqueous stream through a semi-permeable membrane and separation of a permeate from a retentate. In the present invention, a reverse osmosis process through a semi-permeable membrane separates biuret from the aqueous solution of water and urea.

The applicant has experimentally tested that the molecule of biuret can be separated efficiently from a urea solution in a membrane based RO process. A preferred membrane for carrying out the invention is a thin-film composite (TFC) membrane. Preferably the process of the invention is carried out with a membrane having a nominal retention coefficient equal to or greater than 99.0% on NaCl.

The invention is preferably applied to the aqueous urea solution withdrawn from the recovery section of a urea plant, which consists essentially of urea and water.

An aspect of the invention is a process comprising:
reacting ammonia and carbon dioxide under urea-forming conditions and urea synthesis pressure in a urea synthesis section to form a urea-containing reaction effluent;
processing said urea-containing reaction effluent in a recovery section, including one or more recovery stages at a recovery pressure lower than said urea synthesis pressure, to remove unreacted ammonia and carbon dioxide from the reaction effluent and obtain a urea aqueous solution;
purifying said urea aqueous solution to remove biuret with a process of reverse osmosis.

One of the aspects of the invention is the hindsight that biuret can be removed from the aqueous urea solution, with a reverse osmosis process, before the urea solution is sent to a concentration section for the production of solid urea. Accordingly an aspect of the invention is also a process for producing solid urea which includes the steps of taking an aqueous solution of urea from the recovery section of a urea synthesis plant, optionally after storage of the solution in a tank, removal of biuret with a reverse osmosis process; subsequent concentration of the so obtained low-biuret solution to remove water; processing of the so obtained concentrated solution or melt to obtain a solid urea product, e.g. by granulation or prilling.

In another interesting application, an aqueous solution of urea for SCR (SCR solution), preferably containing 30 to 35% urea by weight, is purified from biuret with a reverse osmosis process. Said aqueous solution may be obtained by dissolving solid urea in water or simply by diluting a more concentrated solution (e.g. the solution from the recovery section) with water.

Another aspect of the invention is a plant for the production of urea according to the claims.

The process of the invention does not significantly separate urea from water. Accordingly a solution with a reduced content of biuret obtained with the process of the invention may have the same or substantially the same water to urea ratio (kg/kg) as the input solution. The removal of biuret alone without affecting the water to urea ratio can be achieved with an appropriate difference of pressure across the membrane. Said difference of pressure denotes the difference of pressure between the permeate side and retentate side of the membrane and is commonly termed delta-pressure.

The delta-pressure across the membrane is greater than a first osmotic pressure $\Pi_1$ and lower than a second osmotic pressure $\Pi_2$ wherein: the first osmotic pressure $\Pi_1$ is the osmotic pressure that can be calculated for the aqueous urea solution assuming biuret is the solute and the urea/water mixture is the solvent; the second osmotic pressure $\Pi_2$ is the osmotic pressure that can be calculated for the aqueous urea solution assuming urea is the solute and water is the solvent. By selecting a delta pressure in this range, a significant amount of biuret can be removed obtaining a permeate with substantially the same water to urea ratio as the input solution.

PREFERRED EMBODIMENTS

In this description and in the claims, all percentages are given in weight unless otherwise specified.

The reverse osmosis process of the present invention is preferably performed with the input urea-containing stream having a temperature of 60° C. to 90° C., preferably 70° C. to 80. Particularly preferably, the temperature of the input stream is 70° C. to 75° C.

The RO process may be performed in a single RO stage or, more preferably, in a plurality of RO stages in a cascade. Each stage preferably operates within the above mentioned temperature ranges. The term cascade denotes that at least one of the permeate, the retentate or both of them of at least one stage is/are further processed in one or more subsequent stages.

In multiple-stage embodiments the various preferred embodiments of the process, which are disclosed in this description, may be applied to at least one stage or, preferably, to all stages.

The difference of pressure across the RO stage, or each RO stage in case of multiple stages, is preferably 30 bar to 70 bar, more preferably 35 bar to 50 bar and more preferably 40 bar or around 40 bar. The permeability of one stage may be, for example, around 10 litres per hour and per $m^2$.

A reverse osmosis stage produces a permeate and a retentate. The permeate is the purified solution containing less biuret than the input solution; the retentate contains the biuret removed from the input solution and therefore has a relatively high content of biuret, typically more than 1% by weight.

In a multiple-stage embodiment, the input solution may be processed in a first RO stage obtaining a first permeate and a first retentate. The first permeate may be processed through a first set of one or more subsequent RO stages wherein the permeate of the n-th stage is sent to the (n+1)-th stage for further removal of biuret. The permeate of the last stage represents the purified solution produced by the overall RO process.

The first retentate may be processed through a second set of one or more RO stages. The retentate of the last RO stage of said second set eventually forms a biuret-rich stream.

The retentate stream(s) from RO stages of said first set together with the permeate stream(s) taken from the RO stages of said second set may be recycled to the inlet of the first RO stage together with the input solution.

The input aqueous solution of urea, after its withdrawal from the recovery section, may be stored in a urea solution tank. In accordance with this embodiment, the urea aqueous solution which is subject to reverse osmosis for removal of biuret is taken from said tank. Preferably the input solution contains at least 25% urea. At this concentration the osmotic pressure calculated for the binary mixture wherein water is the solvent and urea is the solute, is significantly higher than 100 bar. Preferably, urea and water account together for at least 90% wt of the solution, more preferably at least 95% wt. When the input solution is the solution obtained from a recovery section of a urea plant, it contains preferably 60% to 90% of urea by weight. The balance is predominantly water and includes biuret and possibly other impurities.

In some embodiments a step of flash or pre-evaporation at a sub-atmospheric pressure of the urea aqueous solution may be performed before said solution is stored in the tank. The term sub-atmospheric pressure denotes an absolute pressure of less than 1 bar, preferably less than 0.5 bar. This preliminary step of flash or pre-evaporation is advantageous to maintain a low concentration of carbonates in the solution stored in the tank. Preferably the carbonates are kept below 0.2% by weight and more preferably below 0.1%.

A low carbonate content in the solution may be helpful to maintain the osmotic pressure of the concentrate below a desired level, e.g. less than 70 bar or preferably less than 40 bar. It should be noted in this respect that a semi-permeable membrane is typically highly selective to salts. For example in a multiple-stage RO process the salts contained in the input solution may be almost completely removed in the first stage. For this reason, a high content of salts (e.g. carbonates) in the input solution may lead to undesirable increase of the osmotic pressure.

The low-biuret purified solution which is obtained after the reverse osmosis process may have a content of biuret half of the input concentration.

The purified solution obtained after the reverse osmosis process may be subject to a step of evaporation to remove water. Particularly preferably, said step of evaporation obtains a highly concentrated solution or urea melt suitable for granulation or prilling.

The solid product resulting from the low-biuret purified solution which is obtained after the reverse osmosis process may contain no more than 0.7% wt of biuret.

A biuret-rich stream (retentate) produced in the RO process may be used as raw material for obtaining a secondary product based on biuret, for example feed-grade biuret. This biuret-rich stream may also be recycled to a urea plant, e.g.

added to a condenser of a recovery section to help condensation of vapours containing ammonia and $CO_2$. If this is the case, the flow rate of the retentate recycled to the recovery section is preferably not greater than 10% of the flow rate of the aqueous solution subject to the reverse osmosis purification process.

In the various embodiments of the invention, the aqueous urea solution which is subject to the RO process of purification may be regarded as a binary mixture wherein the biuret is a solute and the water-urea mixture is a solvent. That is to say, the water-urea mixture can be regarded as a solvent of the biuret. Also in case the input solution contains significant amounts of carbonates and/or ammonia, this approach is still applicable considering biuret and carbonates as the solute and the mixture of water, urea and ammonia as the solvent.

The osmotic pressure can be calculated using the following formula:

$$\prod = -\frac{RT}{v_{solvent}} \cdot \ln(a_{solvent})$$

wherein: $\Pi$ is the osmotic pressure (Pa);
R is the universal gas constant (J K$^{-1}$ mol$^{-1}$);
T is the absolute temperature (K);
$v_{solvent}$ is the molar volume of the solvent (m$^3$ mol$^{-1}$);
$a_{solvent}$ is the (dimensionless) activity of the solvent.

For a diluted solution, the activity of the solvent can be approximated to the molar fraction of solvent.

It has to be noted that the coefficient of rejection of carbonates possibly dissolved in the input solution is significantly greater than the coefficient of rejection of the biuret, due to dissociation of the carbonates. The term carbonates denotes salts of the carbonic acid.

The invention is applicable to all known processes and plants for the synthesis of urea. A preferred application is to a stripping process, most preferably a $CO_2$-stripping process.

The invention, in its various embodiments, allows produce a low-biuret solid urea or low-biuret urea solution without the cost and complication of a crystallization section.

The invention is now further elucidated with reference to preferred embodiments and the accompanying figures.

DETAILED DESCRIPTION

Figure 1:
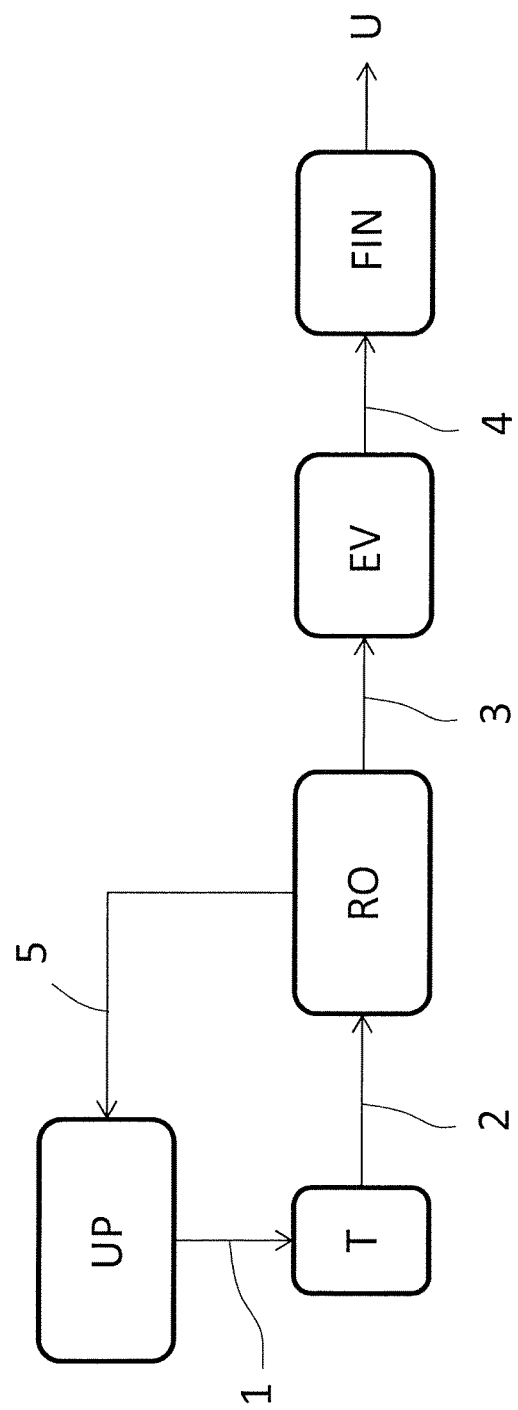
FIG. 1 is a scheme of a process for producing urea in an embodiment of the invention.

Referring to FIG. 1, a urea synthesis plant UP produces a urea aqueous solution 1 of urea. Said solution 1 is taken from a recovery section of the plant UP. The plant UP more in detail may include a high-pressure synthesis section—e.g. a $CO_2$-stripping synthesis section—and a low-pressure recovery section from which the solution 1 is obtained.

Said solution 1 is stored in a urea solution tank T. The solution 2 taken from said tank 2 is sent to a reverse osmosis section RO including a membrane package which performs a reverse osmosis process to remove biuret from said solution 2.

A low biuret urea solution 3 is obtained from the section RO. This low-biuret solution 3 is sent to an evaporation section EV where water is removed and a highly concentrated solution 4 is obtained. This highly concentrated solution 4 is processed in a finishing section FIN to obtain solid urea U in the form of prills or granules.

A biuret-rich solution 5 is also produced in the section RO. Said solution 5 contains the biuret removed from the input solution 4 and has typically more than 1% biuret. Said solution 5 is recycled to the plant UP. A preferred use of the solution 5 in the plant is sending the solution 5 into a condenser of ammonia and $CO_2$ vapours.

In another interesting application, water may be added to the stream 3 to produce a urea solution for use in SCR for removal of NOx.

Figure 2:
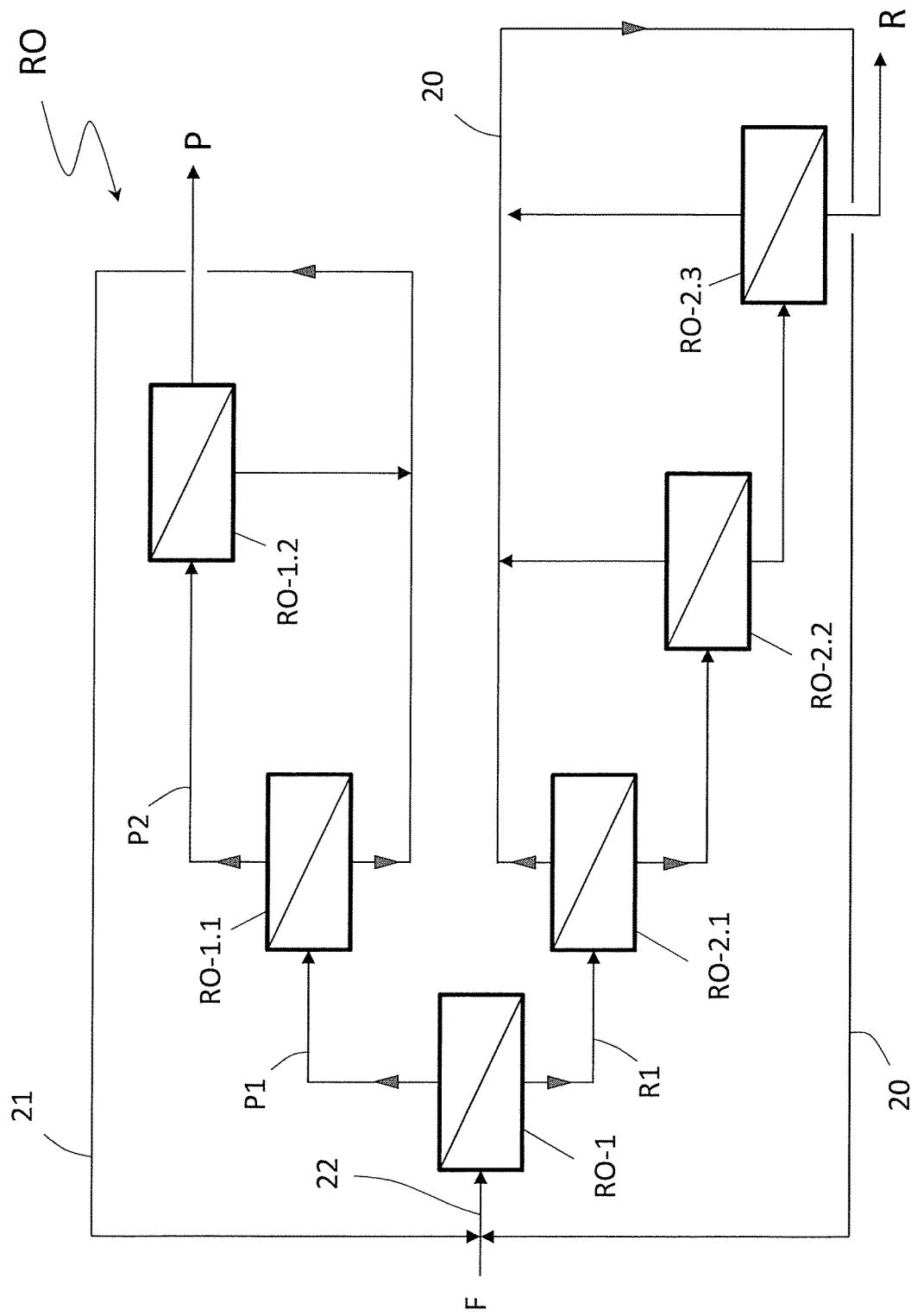
FIG. 2 is a scheme of a multiple-stage reverse osmosis section which can be used to implement the invention.

FIG. 2 illustrates an exemplary embodiment of the section RO section.

An input solution F (e.g. the solution 2 of FIG. 1) is sent to a first reverse osmosis stage RO-1 together with internal recycle streams 20, 21. The stage RO-1 therefore receives a mixed stream 22 and produces a first permeate P1 and a first retentate R1.

The first permeate P1 is processed in a set of stages RO-1.1 and RO-1.2 wherein the permeate is progressively purified. Particularly the permeate P2 of the stage RO-1.1 is further purified in the stage RO-1.2 to produce a permeate P which is a first output of the process (e.g. the stream 3 of FIG. 1).

The first retentate R1 is processed in a set of stages RO-2.1 to RO-2.3. The retentate of each stage forms the input of the subsequent stage. The retentate R of the last stage RO-2.3 is another output of the process, for example the stream 5 of FIG. 1.

The stream P has the lowest amount of biuret whilst the stream R has the highest. The permeate streams of the stages RO-2.1 to RO-2.3 and the retentate streams of the stages RO-1.2 and RO-1.3 are streams with intermediate content of biuret; they can be recycled to the inlet of the first stage RO-1 via lines 20, 21 as shown in FIG. 2.

For example, in a preferred embodiment the streams of FIG. 2 have the following flow rates ($m^3/h$) and mass fraction of biuret $w_B$.

| Stream | $m^3/h$ | $w_B$ |
|---|---|---|
| F | 95 | 0.50 |
| 22 | 290 | 0.77 |
| P1 | 194 | 0.50 |
| P2 | 107 | 0.34 |
| P | 88 | 0.25 |
| R | 7 | 4.0 |
| 20 | 90 | 1.05 |

The invention achieves the above mentioned goals of providing a cost-effective process for removing biuret from urea solutions and produce low-biuret urea.

What is claimed is:

1. A process for purifying a urea-containing aqueous stream comprising a step of removing biuret from the urea-containing stream by reverse osmosis, wherein the urea-containing stream is an aqueous solution of urea obtained from a recovery section of a urea plant, said process comprising a step of performing the reverse osmosis with reverse osmosis stages in a cascade.

2. The process according to claim 1, comprising a step of performing the reverse osmosis with a thin-film composite membrane.

3. The process according to claim 1, comprising a step of performing the reverse osmosis with the urea-containing stream having a temperature of 60° C. to 90° C.

4. The process according to claim 1, wherein the difference of pressure across each stage of the reverse osmosis process is 30 bar to 70 bar.

5. The process according to claim 1, wherein the process produces a purified solution with a content of biuret lower than the input solution and having the same or substantially the same water to urea ratio as the input solution.

6. The process according to claim 1, wherein the aqueous urea solution contains at least 25% wt of urea.

7. The process comprising:
reacting ammonia and carbon dioxide under urea-forming conditions and urea synthesis pressure in a urea synthesis section to form a urea-containing reaction effluent;
processing said urea-containing reaction effluent in a recovery section, including one or more recovery stages at a recovery pressure lower than said urea synthesis pressure, to remove unreacted ammonia and carbon dioxide from the reaction effluent and obtain a urea aqueous solution;
purifying said urea aqueous solution to remove biuret with a process according to claim 1.

8. The process according to claim 7, wherein all or some of the urea aqueous solution withdrawn from the recovery section is stored in a urea solution tank and the urea aqueous solution subject to said reverse osmosis is taken from said tank.

9. The process according to claim 8, including a step of flashing or pre-evaporating at a subatmospheric pressure the urea aqueous solution before said solution is stored in said tank.

10. The process according to claim 8, comprising a step of removing water from a purified urea solution obtained with the reverse osmosis process, through evaporation.

11. The process according to claim 7, wherein the osmosis process produces a permeate, which is a purified low-biuret urea-containing solution, and a retentate, which contains biuret removed from the input solution, and wherein the process further comprises recycling at least part of said retentate to the recovery section.

12. The process according to claim 11, comprising a condensation step of $CO_2$- and ammonia-containing vapours, wherein condensation is improved with the retentate recycled to the recovery section.

13. The process according to claim 11, wherein the flow rate of the retentate to the recovery section is not greater than 10% of the flow rate of the aqueous solution subject to the reverse osmosis purification process.

14. The process according to claim 7, further including the production of biuret or feed-grade biuret and wherein said biuret or said feed-grade biuret is produced with at least part of said retentate.

15. The process according to claim 7, comprising a step of synthetizing urea with a stripping process.

16. The process according to claim 1, comprising a step of performing the reverse osmosis with the urea-containing stream having a temperature of 70° C. to 80° C.

17. The process according to claim 4, wherein the difference of pressure across each stage of the reverse osmosis process is 35 bar to 50 bar.

18. The process according to claim 4, wherein the difference of pressure across each stage of the reverse osmosis process is 40 bar or around 40 bar.

19. The process according to claim 6, wherein the aqueous urea solution contains 60 to 90 wt % of urea.

20. The process according to claim 15, wherein the stripping process comprises a $CO_2$-stripping process.

21. The process according to claim 7, comprising a step of obtaining a solid product from the purified urea aqueous solution, which has a content of biuret of no more than 0.7% wt.

* * * * *